US011808581B2

United States Patent
Hansson et al.

(10) Patent No.: US 11,808,581 B2
(45) Date of Patent: Nov. 7, 2023

(54) LANE-LEVEL MAP MATCHING

(71) Applicant: ZENUITY AB, Gothenburg (SE)

(72) Inventors: Anders Hansson, Gothenburg (SE);
Roza Maghsood, Västra Frölunda (SE);
Eliza Nordén, Gothenburg (SE); Ellen Korsberg, Gothenburg (SE)

(73) Assignee: Zenuity AB, Gothenburg (SE)

(*) Notice: Subject to any disclaimer, the term of this patent is extended or adjusted under 35 U.S.C. 154(b) by 516 days.

(21) Appl. No.: 16/893,522

(22) Filed: Jun. 5, 2020

(65) Prior Publication Data
US 2020/0386557 A1 Dec. 10, 2020

(30) Foreign Application Priority Data

Jun. 7, 2019 (EP) .................................... 19179083

(51) Int. Cl.
*G01C 21/32* (2006.01)
*B60W 60/00* (2020.01)
(Continued)

(52) U.S. Cl.
CPC ........... *G01C 21/32* (2013.01); *B60W 60/001* (2020.02); *G05D 1/0214* (2013.01);
(Continued)

(58) Field of Classification Search
CPC ........... G01C 21/32; G05D 2201/0213; G05D 1/027; G05D 1/0214; B60W 2552/53;
(Continued)

(56) References Cited

U.S. PATENT DOCUMENTS

2017/0336788 A1 11/2017 Iagnemma
2018/0189323 A1* 7/2018 Wheeler ................ G01C 21/00

FOREIGN PATENT DOCUMENTS

WO 2019083513 A1 5/2019
WO WO-2019083513 A1 * 5/2019 ........ B60W 60/0011

OTHER PUBLICATIONS

Nashed, Samir B. et al., "Localization under Topological Uncertainty for Lane Identification of Autonomous Vehicles", Cornell University Library, Ithaca, New York, Mar. 4, 2018, 6 pages.
(Continued)

*Primary Examiner* — Kenneth J Malkowski
(74) *Attorney, Agent, or Firm* — SAGE PATENT GROUP

(57) ABSTRACT

The present disclosure relates to lane-level map matching for a vehicle. The method includes receiving vehicle data including a geographical position of the vehicle, a heading of the vehicle, and a speed of the vehicle and receiving sensor data from a perception system of the vehicle. The sensor data includes information about a position of at least one road reference in a surrounding environment of the vehicle. Operations include receiving map data including a lane geometry of the surrounding environment of the vehicle, the lane geometry including a set of candidate lanes. Operations include forming a state space model including a set of states. Each state of the set of states represents a candidate lane of the set of candidate lanes, and defining a cost for going from each state to every other state of the set of states based on the received vehicle data and the received sensor data.

14 Claims, 4 Drawing Sheets

(51) Int. Cl.
*G05D 1/02* (2020.01)
*G06V 20/56* (2022.01)

(52) U.S. Cl.
CPC ....... *G06V 20/588* (2022.01); *B60W 2520/10* (2013.01); *B60W 2520/12* (2013.01); *B60W 2520/14* (2013.01); *B60W 2552/53* (2020.02); *B60W 2556/40* (2020.02); *G05D 1/027* (2013.01); *G05D 2201/0213* (2013.01)

(58) Field of Classification Search
CPC ......... B60W 2556/40; B60W 2520/14; B60W 2520/12; B60W 2520/10; B60W 60/001
See application file for complete search history.

(56) References Cited

OTHER PUBLICATIONS

Atia, Mohamed et al., "Vehicular Lane level Positioning using Low-cost Map-aided GNSS/MEMS IMU Sensors Integration", Proceedings of the 2018 International Technical Meeting, Institute of Navigation ITM 2018, Reston, Virginia, Jan. 29-Feb. 1, 2018, 12 pages.
Schindler, Andreas, "Vehicle Self-localization with High Precision Digital Maps", 2013 IEEE Intelligent Vehicles Symposium (IV), Gold Coast, Australia, Jun. 23-26, 2013, 6 pages.
Extended European Search Report dated Apr. 9, 2020 for European Patent Application No. 19179083.1, 14 pages.

\* cited by examiner

LANE-LEVEL MAP MATCHING

CROSS-REFERENCE TO RELATED APPLICATIONS

The present application for patent claims priority to European Patent Office Application Ser. No. 19179083.1, entitled "LANE-LEVEL MAP MATCHING" filed on Jun. 7, 2019, assigned to the assignee hereof, and expressly incorporated herein by reference.

TECHNICAL FIELD OF THE INVENTION

The present disclosure generally relates to a procedure of matching a vehicle's geographical location data to digital map locations, i.e. map matching. More specifically, the present disclosure relates to a solution for determining a lane path of an autonomous vehicle (AV) or semi-autonomous vehicle (i.e. vehicle equipped with advanced driver-assistance systems).

BACKGROUND

Today's maps are mainly designed for human use. More specifically, they are intended to be used for turn-by-turn navigation purposes. Other environmental information, such as the type and location of lane markers, any debris lying on the road and road maintenance obstructions, is visually obtained by the map user as he/she navigates through the roads. Autonomous vehicles, however, require very different maps. More specifically, these maps need to be in high-definition (HD), providing the "robots" with very precise localization and the possibility to perceive the environment. The HD maps will also need to be updated continuously, to track events such as road accidents or traffic congestion.

Furthermore, just as the vehicle needs minute information about its environment, it needs to know its position on the road. This problem of identifying one's position on the road, is called map matching, and can more formally be described as the procedure of matching location data to a digital map in order to obtain the true position in a road network. Map matching can be considered to be an important aspect for navigation and route guidance systems.

Existing solutions, built on e.g. probability theory, fuzzy logic theory and belief theory, are used to map GPS coordinates to a certain road segment in order to give information about the surroundings of a vehicle.

However, there is a need for new and improved solutions which provide more accurate and robust map matching, by e.g. compensating for the noise nature of GPS signals.

SUMMARY OF THE INVENTION

It is therefore an object of the present disclosure to provide a method for lane-level map matching for a vehicle, a computer-readable storage medium, a control device, and a vehicle which alleviate all or at least some of the drawbacks of presently known systems.

This object is achieved by means of a method for lane-level map matching for a vehicle, a computer-readable storage medium, a control device, and a vehicle as defined in the appended claims. The term exemplary is in the present context to be understood as serving as an instance, example or illustration.

According to a first aspect of the present disclosure, there is provided a method for lane-level map matching for a vehicle. The method comprises receiving vehicle data comprising a geographical position of the vehicle, a heading of the vehicle, and a speed of the vehicle. The method further comprises receiving sensor data from a perception system of the vehicle. The sensor data comprising information about a position of at least one road reference in a surrounding environment of the vehicle. Furthermore the method comprises receiving map data comprising a lane geometry of the surrounding environment of the vehicle, the lane geometry comprising a set of candidate lanes. Next, the method comprises forming a state space model comprising a set of states, wherein each state of the set of states represents a candidate lane of the set of candidate lanes, and defining a cost for going from each state to every other state of the set of states based on the received vehicle data and the received sensor data. Furthermore, the method comprises determining a probable path for the vehicle based on the formed state space model and the defined costs.

The presented method enables for reliable and accurate lane-level map matching. Moreover, the proposed method is robust to error-prone data such as noise GPS measurements and imperfect vision sensor detections. Moreover, the method can be implemented as an online algorithm, which allows for global optimality in every stage of the calculation.

Further, the present inventors realized that sensor observations of the surrounding environment can be fused together with location data in order to add robustness to conventional GPS-based map matching. Moreover, by forming a state space model and computing the most probable path by observing the probability of the vehicle being in a particular state at a given time, a computationally efficient and accurate map matching solution can be provided.

According to an exemplary embodiment of the present disclosure each state is a hidden state in a Hidden Markov Model, and the cost is defined based on a first predefined probability $E_k$ for making an observation $y_k$ at a time $t_k$ when being in state $x_m$, and a second predefined probability $T_k$ for moving from a first state $x_k$ of the set of states to another state $x_{k+1}$ of the set of states at the time $t_k$.

According to a second aspect of the present disclosure, there is provided a (non-transitory) computer-readable storage medium storing one or more programs configured to be executed by one or more processors of a vehicle control system, the one or more programs comprising instructions for performing the method according to any one of the embodiments disclosed herein. With this aspect of the disclosure, similar advantages and preferred features are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a third aspect of the present disclosure there is provided a control device for lane-level map matching for a vehicle, where the control device comprises control circuitry configured to receive vehicle data comprising a geographical position of the vehicle, a heading of the vehicle, and a speed of the vehicle. The control circuitry is configured to receive sensor data from a perception system of the vehicle. The sensor data comprises information about a position of at least one road reference in a surrounding environment of the vehicle. Further, the control circuitry is configured to receive map data comprising a lane geometry of the surrounding environment of the vehicle, where the lane geometry comprises a set of candidate lanes. Next, the control circuitry is configured to form a state space model comprising a set of states, wherein each state of the set of states represents a candidate lane of the set of candidate lanes. The control circuitry is further configured to define a cost for going from each state to every other state of the set of states based on the received vehicle data and the received sensor data, and determine a probable path for the vehicle based on the formed state space model and the defined costs. With this aspect of the disclosure, similar advantages and preferred features are present as in the previously discussed first aspect of the disclosure.

According to a fourth aspect of the present disclosure, there is provided a vehicle comprising a perception system comprising at least one sensor for monitoring a surrounding environment of the vehicle. The vehicle further comprises an inertial measurement unit (IMU) for measuring an inertial movement of the vehicle, a localization system for monitoring a geographical position and a heading of the vehicle, and a control device according to any one of the embodiments disclosed herein. With this aspect of the disclosure, similar advantages and preferred features are present as in the previously discussed first aspect of the disclosure.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF FIGURES

Further objects, features and advantages of embodiments of the disclosure will appear from the following detailed description, reference being made to the accompanying drawings, in which.

DETAILED DESCRIPTION

Figure 1:
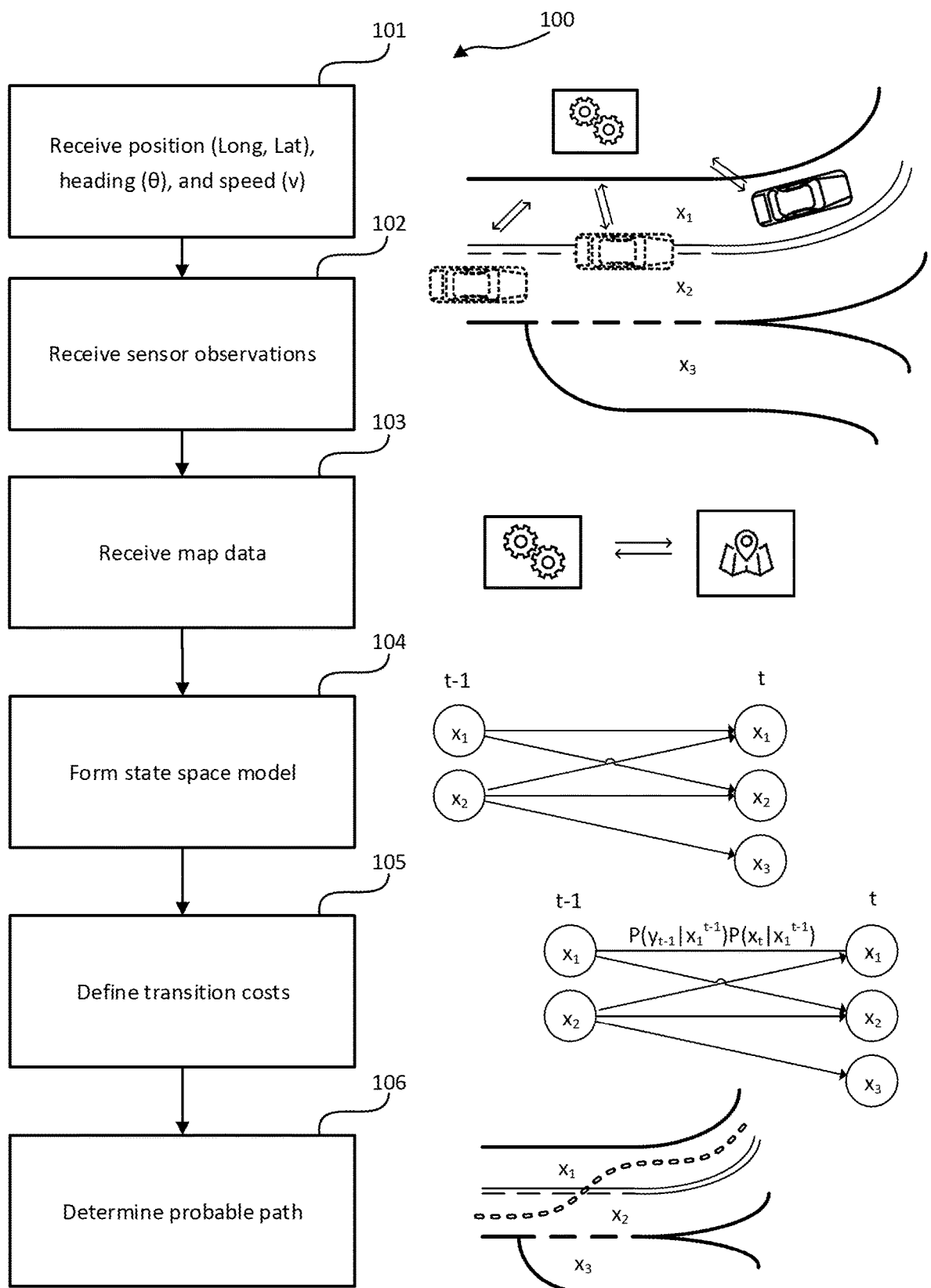
FIG. 1 is a schematic flow chart representation of a method for lane-level map matching for a vehicle traveling on a road in accordance with an embodiment of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components. A vehicle is in the present context to be understood as a road vehicle such as a car, a bus, a truck, construction vehicles, and the like.

FIG. 1 is a schematic flow chart representation of a method 100 for lane-level map matching for a vehicle. Map matching can be understood as a process of matching a vehicle's location data to a digital map in order to obtain the true position in a road network. FIG. 1 further includes illustrative drawings of the different method steps 101-106 to the right of the boxes 101-106 of the flow chart. Moreover, the method 100 provides for "lane-level" matching, meaning that not only is the vehicle location data matched to a specific road, but to a specific lane on that road.

Moving on, the method 100 comprises receiving vehicle data from e.g. a localization system of the vehicle. The vehicle data comprises a geographical position (latitude, longitude), a heading of the vehicle (yaw angle) and a speed of the vehicle. The vehicle data may be received 101 from a localization system of the vehicle (e.g. a Global Navigation Satellite System, GNSS), an inertial measurement unit (IMU) together with HD Map data, or a combination of system. The method 100 further comprises receiving sensor data from a perception system of the vehicle. The sensor data comprises at least information about a position of at least one road reference in a surrounding environment of the vehicle. A road reference may for example be a lane marking, a traffic sign, a road edge, a road barrier, or any other suitable landmark. Moreover, the position of the one or more road references can be determined in reference to a local coordinate system of the vehicle or in reference to a global coordinate system, depending on application and implementation choices. A perception system is in the present context to be understood as a system responsible for acquiring raw sensor data from on sensors such as cameras, LIDARs and RADARs, ultrasonic sensors, and converting this raw data into scene understanding. Naturally, the sensor data may be received 102 directly from one or more suitable sensors (such as e.g. cameras, LIDAR sensors, radars, ultrasonic sensors, etc.)

Further, in relation to the road references, the sensor data may comprise lane marker data, where the lane marker data can include a distance to one or more lane markers (relative to the ego-vehicle) and a type of lane marker (broken line, semantics, solid line, etc.). Sensor data may further include lane marking geometries (could be represented as a polynomial or as a clothoid, depending on camera software).

The method 100 further comprises receiving 103 map data comprising a lane geometry of the surrounding environment of the vehicle. The lane geometry comprises a set (i.e. a plurality) of candidate lanes. A candidate lane is in the present context to be understood as a drivable lane on a road in the surrounding environment of the vehicle, i.e. a lane in which the vehicle may or may not travel. The map data may be in the form of High-Definition (HD) map data, i.e. map data having high precision (at centimetre-level). HD maps are maps that are purposely built for robots to manoeuvre themselves around a 3D space. In more detail, these maps need to be precise and contain a lot of information, which humans may take for granted. Not only that the maps should contain information about where the lanes are, where the road boundaries are, one also wants to know where the curves are and how high the curves are.

The lane geometry may for example be retrieved 103 from defined portion of an HD map, where the defined portion may be all lane geometries that are within a circle of a predefined radius. The centre of the circle may for example be determined based on the previously received 101 geographical position of the vehicle. The radius may be defined based on a measurement error of the received 101 geographical position, for example 20 meters, or 50 meters in an urban canyon. In order to increase computing efficiency, the method may include forming a spatial data base based on the received 103 map data and a spatial indexing method (e.g. Geohash, Quadtree, M-tree, X-tree, R-tree, etc.). For example, an R-tree of the retrieved 103 lane geometries can be built and furthermore packed by using a sorting method (e.g. Sort-Tile-Recursive (STR), Nearest-X, Overlap Minimizing Top-Down (OMT), etc.). This spatial indexing and packing allows one to quickly find a set of candidate lanes from the received 103 HD map.

Next, a state space model comprising a set of states is formed 104. Each state of the set of states represents a candidate lane of the set of candidate lanes (retrieved from the map data). A state space model is in the present context to be understood as type of probabilistic graphical model, which describes a probabilistic dependence between the latent state variable and the observed measurement. The state or the measurement can be either continuous or discrete. The state space model is used to provide a general framework for analysing deterministic and stochastic dynamical systems that are measured or observed through a stochastic process.

More specifically, the method 100 may comprise forming a Hidden Markov Model (HMM), which is considered to be a sub-type of state-space model in the present disclosure. In more detail, each candidate lane is considered to be represented by a hidden state in the HMM, where the received vehicle data and sensor data are used to estimate the hidden states, i.e. in which lanes the vehicle is actually traveling. Further details related to the Hidden Markov Model and embodiments of the present disclosure related thereto will be discussed in reference to FIG. 2.

Further, the method 100 comprises defining 105 a cost for going from each state to every other state of the set of states in the state space model. The costs are computed based on the received vehicle data, the received sensor data and the received map data. In more detail, the costs can be defined 105 as probabilities, i.e. the likelihood of the vehicle going from a first state to a second state at a time t or remaining in the first state at the time t.

Moving on, the method further comprises determining 106 a probable path for the vehicle based on the formed state space model and the defined costs. In other words, the probable path of the vehicle is determined by computing the probability of a plurality of possible paths (state transitions) where the probability is determined based on the received 102 sensor observations and the received 101 vehicle data. The computation for determining 106 the probable path may for example be executed by numerical optimization solvers.

Initial state probabilities, i.e. the probability of the vehicle being in each state at time t=0 may also be computed. For this computation one may use the received 101 vehicle data, the received 102 sensor data, and the obtained 103 HD map. Alternatively, one may assign equal probabilities for starting in each state.

Moreover, the method 100 may further comprise a step of sending the determined 106 probable path to a control system for controlling a driver-assistance or autonomous driving feature of the vehicle, or to a map generating system for updating a map of the surrounding environment. In reference to the former, the probable path may be used to activate, deactivate or adjust specific ADAS or AD features of the vehicle based on which lane the vehicle is traveling. In more detail, the probable path may be used to more accurately estimate a position of the vehicle, wherefore appropriate adjustments of ADAS or AD features may be performed (e.g. adjusting a following distance to lead vehicle, adjusting emergency brake thresholds, etc.). In reference to the map generating system, which may be local or remote the vehicle, the probable path can be used as input to identify new lanes or re-routed lanes. Thus, vehicle's implementing the disclosed method can be used as probes for map updates.

Referring to FIG. 1, a stretch of road having three lanes $x1, x2, x3$ is depicted. A first lane $x1$ and a second lane $x2$ are parallel and separate by double lane markings. The second lane $x2$ splits into a third lane $x3$. In the schematic drawings, the corresponding state transitions are illustrated as circles interconnected with solid arrows. In the illustrated case of FIG. 1, there are only two possible lane candidates at time $x1$ and $x2$ at time t−1. In other words, at time t−1, the vehicle can only travel in one of two possible lanes (retrieved from the received 103 map data with the help of the received 101 vehicle data comprising a GPS position with an associated measurement error radius as described in the foregoing).

The arrows indicate the possible transitions between the lanes $x_1, x_2, x_3$. For example, given that the vehicle is in lane $x_1$ at time t−1, it can either stay in lane $x_1$, or it can change lane from $x_1$ to $x_2$. Since the double lane marking is solid/dashed, one can argue conclude that there is a relatively small probability that the vehicle changes lane from the first lane $x_1$ to the second lane $x_2$ (since a lane change from the first lane $x_1$ to the second lane $x_2$ would imply that the vehicle is breaking a traffic rule, which is here assumed to have a reduced likelihood). On the other hand, the vehicle is more likely to change lane from $x_2$ to $x_1$ (perhaps there is a vehicle in front of it that slows down in order to turn onto the exit lane $x_3$). Of course, the car can also stay in its lane. Moreover, the topology of the road network restricts us from going directly from the first lane $x_1$ to the third lane $x_3$ (without first passing the second lane $x_2$), in the present example. Further, the probable path can be determined 106 by computing the costs, at time t>0, of going from any candidate lane at time t−1 to any other candidate state at time t. For this computation, measurements contained in the received 101 vehicle data and the received 102 sensor data as well as the received 103 map data are used. The costs may for example be determined/computed 105 by multiplying probabilities such as $P(y_{t-1}|x_1^{t-1})*P(x_t|x_1^{t-1})$, where $P(y_{t-1}|x_1^{t-1})$ can be defined as a difference between the lane marking type reported by the perception system and the candidate HD map lane marking type, while $P(x_t|x_1^{t-1})$ can be defined as a difference between the measured heading of the vehicle and a direction of a candidate lane in the HD map. An optimization algorithm (e.g. a max-sum or max-product algorithm) can then be employed to determine 106 the most probable path of the vehicle.

As previously mentioned, the candidate lanes may be represented as hidden states in a Hidden Markov Model (HMM). Thus, FIG. 2 shows a schematic graphical representation of a discrete HMM with three states $s_1$, $s_2$, $s_3$ and three observations $y_1$, $y_2$, $y_3$ with corresponding transmission probabilities $T_{i,j}$, i, j∈{1, 2, 3} and emission probabilities $E_{k,i}$, k∈{1, 2, 3}, i∈{1, 2, 3}.

A Hidden Markov Model (HMM) can be construed as a statistical model in which the system being modelled is assumed to be a stochastic process with unobserved, i.e. hidden, states. The states are contained in a set $\mathcal{S}$, while $\chi \subseteq \mathcal{S}$ describe states in a sequence. More explicitly, the set of states might be $\mathcal{S} = \{s_1, s_2\}$ and a state sequence x could look like $x=[x_1, x_2, x_3]=[s_2, s_2, s_1]$, where $x_1, x_2, x_3 \in \chi$, and $s_1, s_2 \in \mathcal{S}$. The states of an HMM are not directly visible to the observer, which is why they are called hidden. Rather, there exists observations $\mathcal{Y}$ that stem from these hidden states. The sequence of observations are generated by a second stochastic process. In that sense, an HMM is a doubly stochastic process. The HMM comprises three main parameters transition probabilities, emission probabilities and initial state distribution. As a sub-category of Markov Models, the HMM also satisfies the Markov property.

Figure 2:
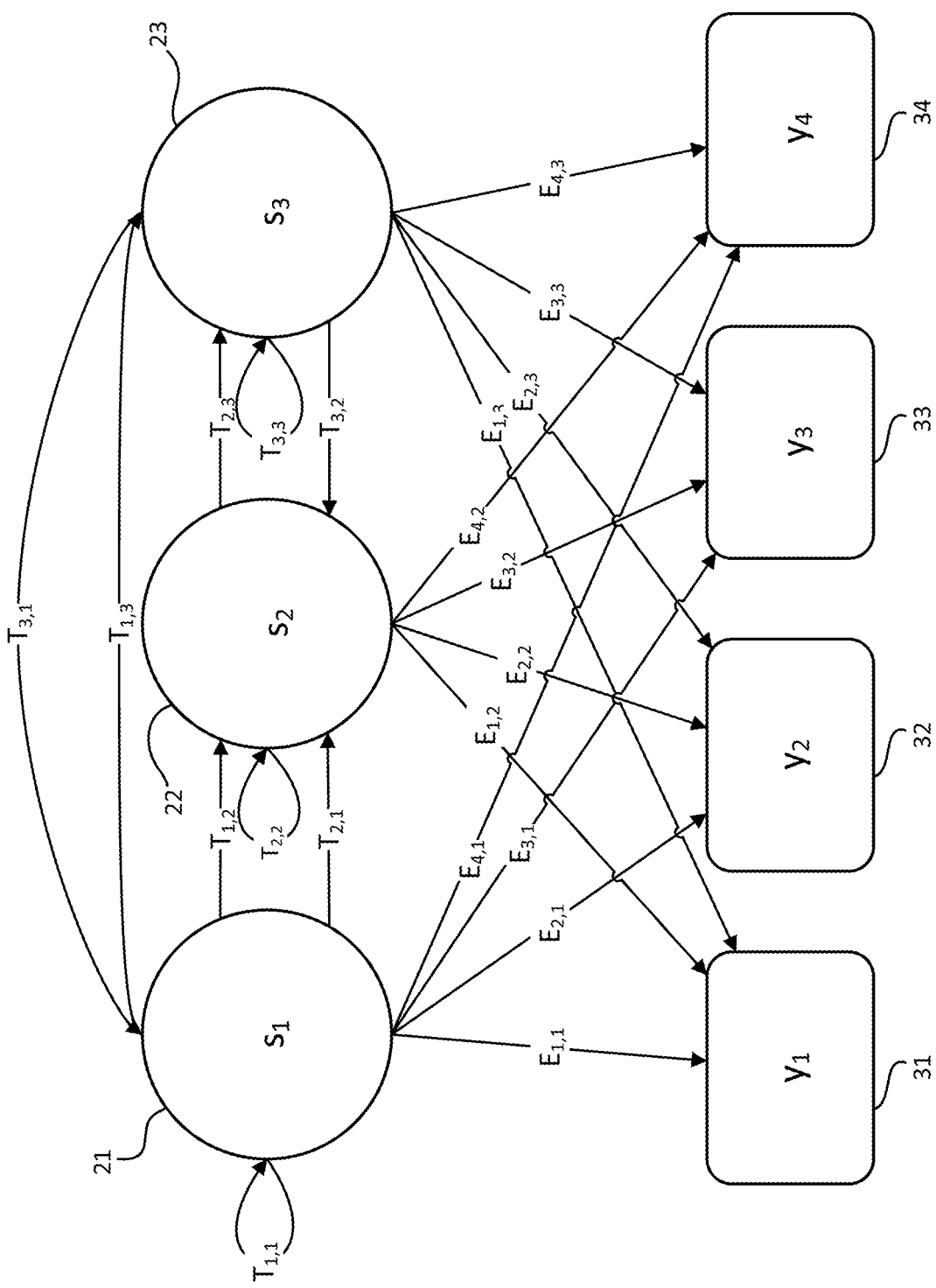
FIG. 2 is a schematic graphical representation of a discrete Hidden Markov Model (HMM) having three states and three observations with corresponding transmission and emission probabilities in accordance with an embodiment of the present disclosure.

In FIG. 2, each hidden state 21, 22, 23 represent a candidate lane obtained from the lane geometry in the received map data, and the bottom boxes 31, 32, 34, 34 represent different "observations" e.g. position of lane markings, type of lane markings, heading, geographical position, etc. Thus, the received vehicle data and sensor data form an observation $y_k$ for a time $t_k$.

The cost for going from each state 21, 22, 23 to every other state 21, 22, 23 of the set of states is based on the received vehicle data and the received sensor data. The costs may for example be defined based on two probabilities, namely a first predefined probability $E_k$ and a second predefined probability $T_k$. In accordance with the exemplary embodiment in which the state space model is in the form of a Hidden Markov Model, the first and second predefined probabilities may be referred to as an emission probability and a transmission probability, respectively. The Emission Probability $E_k$ defines the probability for making an observation $y_k$ at a time $t_k$, when being in a state $x_k$. The transmission probability $T_k$ defines a probability for moving from a first state $x_k$ of the set of states to another state $x_{k+1}$ of the set of states at the time $t_k$.

In more detail, the emission probability $E_k$ is associated with the second stochastic process, which models the distribution of observations. Each observation $y_k$ has an emission probability, $$E_k = P(y_k|x_k) x_k \in \chi \quad (1)$$

which is a probability distribution function that, as mentioned, reflects the probability of making an observation $y_k$ at a time $t_k$, when being in a state $x_k$. When considering explicit states, the emission probability is more appropriately given as, $$E_{k,i} = P(y_k|x_k=s_i) s_i \in \mathcal{S} . \quad (2)$$

The transmission probability $T_k$ is as mentioned, the likelihood of moving from a first state $x_k$ of the set of states to another state $x_{k+1}$ at the time $t_k$. It can be written as, $$T_k = P(x_{k+1}|x_k) x_k, x_{k+1} \in \chi. \quad (3)$$

When considering explicit states, the transition probability is more appropriately given as, $$T_{i,j} = P(x_{k+1}=s_j|x_k=s_i) s_i, s_j \in \mathcal{S} .$$

The distribution of initial state probabilities describes the likelihood of starting in each state, $$\Pi_i = P(x_0=s_i) s_i \in \mathcal{S} . \quad (5)$$

According to an exemplary embodiment of the present disclosure, the sensor data comprises lane marker data. The lane marker data comprises at least a distance to the at least one lane marker and a lane marker type of the at least one lane marker. Moreover, the vehicle data further comprises a yaw rate of the vehicle (obtained from e.g. an inertial measurement unit (IMU) of the vehicle or a steering wheel angle sensor). Accordingly, the first predefined probability (emission probability) $E_k$ may be based one or more of the distance to the at least one lane marker, the lane marker type of the at least one lane marker, the geographical position of the vehicle, and the speed of the vehicle. The emission probability $E_k$ may naturally be based on further parameters such as e.g. the position and type of other landmarks (e.g. traffic signs), lane text (e.g. bus lane), a position of other vehicles in the surrounding environment of the vehicle, confidence of left/right lane marker, distance between left and right marker, and so forth. The second predefined probability (transmission probability) $T_k$ may on the other hand be based on the yaw rate of the vehicle.

In more detail, the yaw rate may be used a lane change indicator since the steering angle approximately resembles a sine wave over time during a lane change. This wave can be modelled by fitting a parametrized sine function $s(\omega)$ of the yaw rate $\omega$, $$s(\omega) = a \cdot \sin(f\omega + p) + c \quad (6)$$

Yaw rates corresponding to a left lane change have an opposite sign as compared to right lane changes. Naturally, the transmission probability may be further based on other lane change indicators in order to improve redundancy. For example, visual data obtained from a vehicle perception system can be used to estimate when a lane change occurs (e.g. based on lane marker types, distance to lane markers, change of distance to lane markers, etc.). Moreover, lane tracing models (e.g. expressed as polynomials or clothoids) can be used as lane change indicators. In more detail, the lateral offset parameter (often denoted as $a_0$ for polynomial lane boundary representations) can be used to indicate a lane change. For example, if the lateral offset parameter (lateral offset between the vehicle and the lane trace) of the right lane trace becomes smaller and smaller over time, it is probable that a right lane change is occurring.

Figure 3:
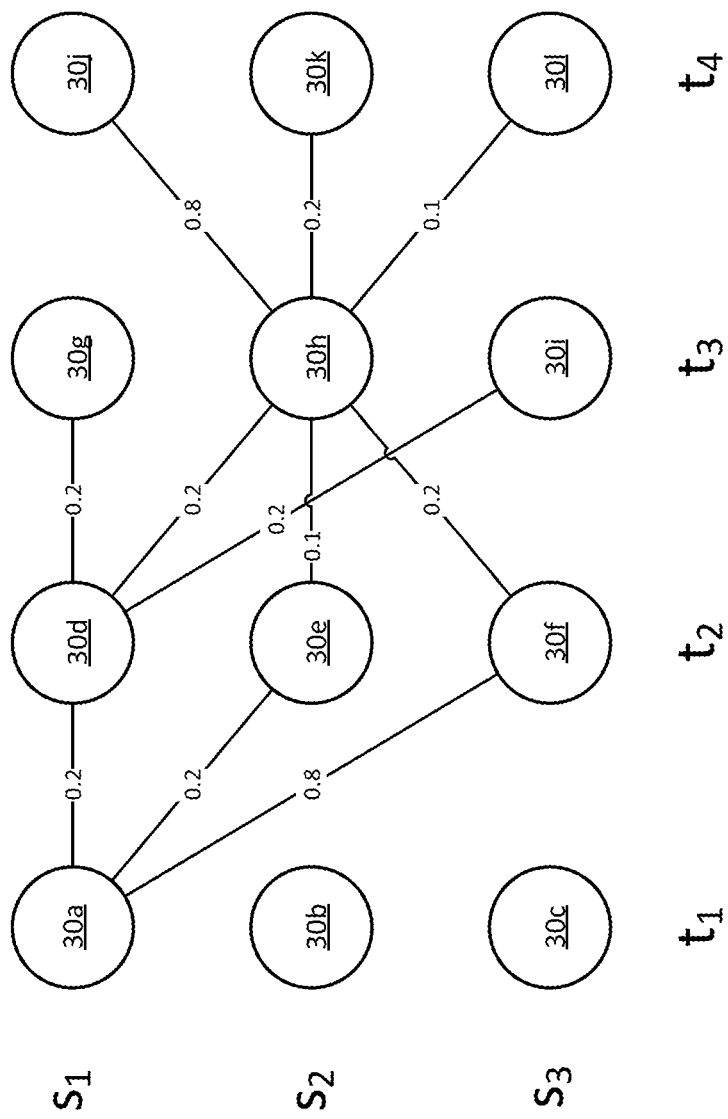
FIG. 3 is a schematic trellis diagram representation of the HMM of FIG. 2.

A discrete HMM may be represented as a trellis diagram, where time steps $t_1$-$t_4$ are incorporated, as illustrated in FIG. 3. Each node 30a-30l in the diagram corresponds to a distinct state $s_1$-$s_3$ at a given time $t_1$-$t_4$, and the edges (interconnecting lines) represent possible transitions to states at the next time step $t_1$-$t_4$. The edge weights are here chosen to correspond to the product of transition and emission probabilities $T_k$, $E_k$. In the illustrated example, some of these products are zero wherefore the edges have been removed to avoid cluttering. A useful property of this particular representation is that every possible state sequence in the model corresponds to a unique path through the trellis, and the other way around. Because of this, it is a useful representation when applying dynamic programming algorithms (e.g. Viterbi algorithm) to an HMM for finding the most probable path through the model.

In more detail, it can be said that inferring which sequence of states that caused a specific sequence of observations is called decoding. The Viterbi algorithm, is one example of such a decoder. More specifically, it can be said that the Viterbi algorithm solves the problem of estimating the maximum likelihood of state sequences, i.e. it finds the most probable state sequence. The set of transition sequences can be defined as $\xi=\{\xi_1, \ldots, \xi_{K-1}\}$ with the transitions $\xi_k=\{x_{k+1}, x_k\}$ at the given time k. These map one-to-one to the state sequence $x=\{x_1, \ldots, x_K\}$. Using this notation the observations discussed in reference to FIG. 2 $y=\{y_1, \ldots, y_K\}$, $y_k \in \mathcal{Y}$, can be described as the output of a channel, whose input is the transition sequences. The channel is memory-less in the sense that $P(y|\xi)=\Pi_{k=0}^{K} P(y_k|\xi_k)$, i.e. each observation only depends probabilistically on the transition $\xi_k$.

Executable instructions for performing these functions are, optionally, included in a non-transitory computer-readable storage medium or other computer program product configured for execution by one or more processors.

Figure 4:
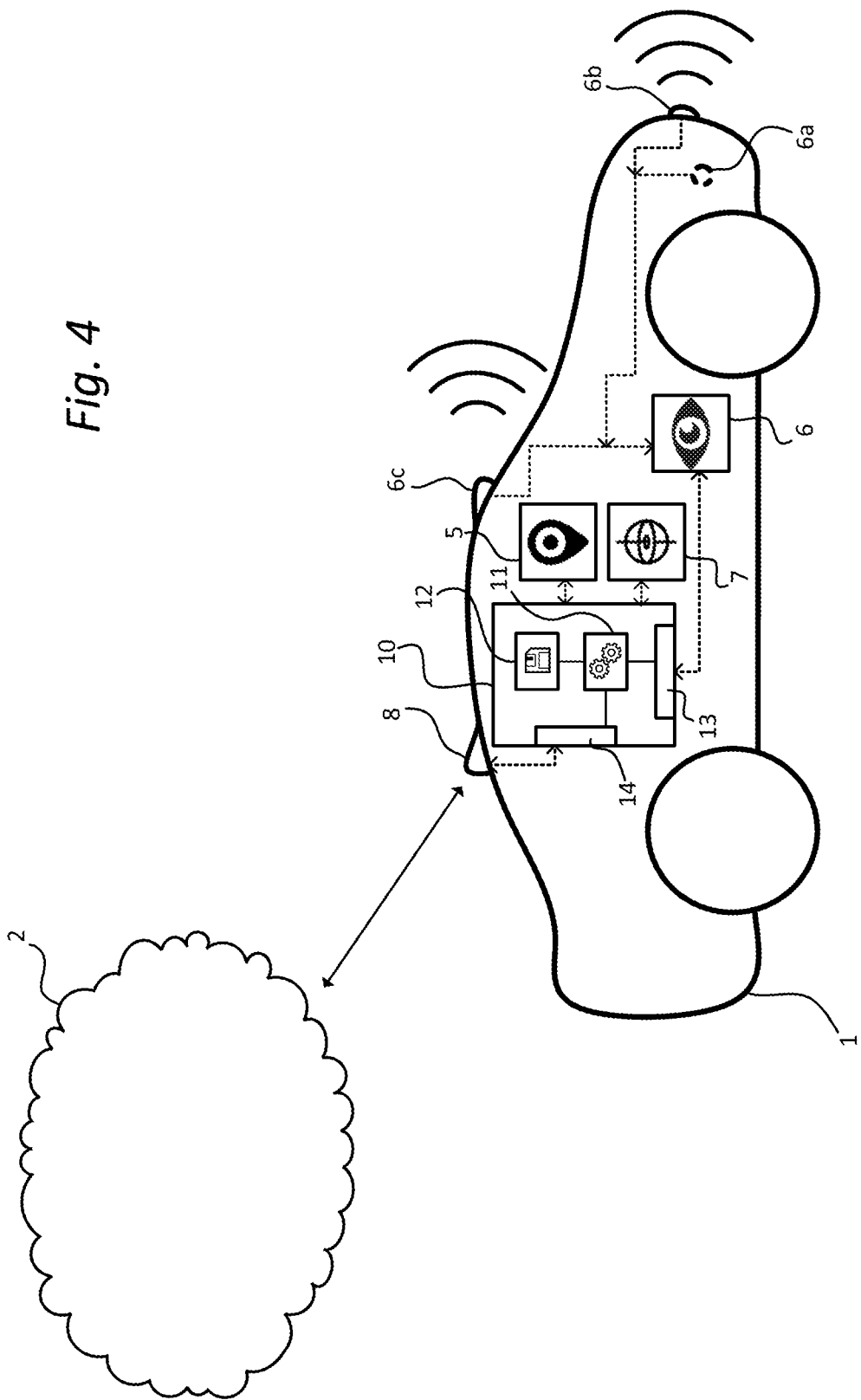
FIG. 4 is a schematic side view of a vehicle having a control device for lane-level map matching for a vehicle traveling on a road in accordance with an embodiment of the present disclosure.

FIG. 4 is a schematic side view of a vehicle 1 comprising a control device 10 for lane-level map matching. The vehicle 1 further comprises a perception system 6, an inertial measurement unit (IMU) 7, and a localization system 5. A perception system 6 is in the present context to be understood as a system responsible for acquiring raw sensor data from on sensors 6a, 6b, 6c such as cameras, LIDARs and RADARs, ultrasonic sensors, and converting this raw data into scene understanding. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy. An IMU 7 is to be understood as an electronic device configured to measure the inertial movement of the vehicle 1. An IMU 7 usually has six degrees of freedom, three accelerometers and three gyroscopes.

The control device 10 comprises one or more processors 11, a memory 12, a sensor interface 13 and a communication interface 14. The processor(s) 11 may also be referred to as a control circuit 11 or control circuitry 11. The control circuit 11 is configured to execute instructions stored in the memory 12 to perform a method for lane-level map matching for a vehicle according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

In more detail, the control circuitry 11 is configured to receive vehicle data comprising a geographical position of the vehicle, a heading of the vehicle and a speed of the vehicle. The vehicle data may for example be obtained from a GPS unit of the vehicle 1. The control circuitry 11 is further configured to receive sensor data from a perception system 6 of the vehicle 1. The sensor data comprises information about a position of at least one road reference in a surrounding environment of the vehicle. The position of the road reference may either be in reference to the vehicle or in a "global" coordinate system depending on specifications. In more detail, the perception system 6 preferably a forward looking camera 6c configured to detect lane-markings on a road. Conventional automotive grade cameras are capable of detecting lane markers that lie within a 25 meter range. The detections give information about distances to the closest markings on the left and right side of the vehicle and their corresponding type. The marker types that can be recognized by the system 6 or the camera 6c include e.g. solid and dashed. Once the lane-markings have been detected, the perceptive projection image can be transformed into its corresponding bird's eye vision.

The control circuitry 11 is further configured to receive map data comprising a lane geometry of the surrounding environment of the vehicle. The lane geometry comprises a set of candidate lanes. The map data may be in the form of a HD map comprising information about roads having multiple parallel lanes, each of which has a centre line represented as a polyline. The polylines are generally two-dimensional, defined by the longitude and latitude of the start and end of each line segment. Also, left and right lane markers signifying the lane border, are polylines. They are also associated with their marker type (e.g. dashed or solid). The map data may also comprise road delimiters such as guard rails, speed limits, lane orientation, etc.

Further, the control circuitry 11 is configured to form a state space model comprising a set of states. Each state of the set of states represents a candidate lane of the set of candidate lanes. Next, the control circuitry 11 is configured to define a cost for going from each state to every other state of the set of states based on the received vehicle data, the received sensor data and the received map data. Various implementations for computing the costs have already been discussed in detail in the foregoing and are analogously applicable with this aspect of the disclosure.

Still further, the control circuitry 11 is configured to determine a probable path for the vehicle based on the formed state space model and the defined costs. In other words, the control circuitry 11 is configured to calculate the most probable path that the vehicle 1 has travelled in based on the formed state space model and defined costs for moving between the states (i.e. moving between the lanes). Even though the control device 11 is here illustrated as an in-vehicle system, some or all of the components may be located remote (e.g. cloud-based solution) to the vehicle in order to increase computational power.

Further, the vehicle 1 may be connected to external network(s) 2 via for instance a wireless link (e.g. for retrieving map data). The same or some other wireless link may be used to communicate with other vehicles 2 in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the control device 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The communication/antenna interface 14 may further provide the possibility to send output to a remote location (e.g. remote operator or control centre) by means of the antenna 8. Moreover, some sensors in the vehicle may communicate with the control device 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs the steps to defining the costs for going from one state to the other. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of receiving signals comprising information about a movement and information about a current road scenario may be interchanged based on a specific realization. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

What is claimed is:

1. A method for lane-level map matching for a vehicle, the method comprising:
   receiving vehicle data comprising a geographical position of the vehicle, a heading of the vehicle, and a speed of the vehicle;
   receiving sensor data from a perception system of the vehicle, the sensor data comprising information about a position of at least one road reference in a surrounding environment of the vehicle;

receiving high-definition (HD) map data comprising a lane geometry of the surrounding environment of the vehicle, the lane geometry comprising a set of candidate lanes;

forming a state space model comprising a set of states, wherein each state of the set of states represents a candidate lane of the set of candidate lanes;

defining a cost for going from each state to every other state of the set of states based on the received vehicle data, the received sensor data and the received HD map data; and determining a probable path of vehicle travel based on the formed state space model and the defined costs, wherein the determining the probable path comprises decoding the formed state space model in order to estimate the maximum likelihood of a plurality of state sequences and determine the most probable state sequence; and sending the probable path to a map generating system for updating an HD map of the surrounding environment.

2. The method according to claim 1, wherein each state is a hidden state in a Hidden Markov Model, and wherein the cost is defined based on:

a first predefined probability $E_k$ for making an observation $y_k$ at a time $t_k$ when being in state $x_m$; and a second predefined probability $T_k$ for moving from a first state $x_k$ of the set of states to another state $x_{k+1}$ of the set of states at the time $t_k$.

3. The method according to claim 2, wherein the sensor data comprises lane marker data comprising a distance to at least one lane marker and a lane marker type of the at least one lane marker, wherein the vehicle data further comprises a yaw rate of the vehicle, wherein the first predefined probability $E_k$ is based on at least one of the distance to the at least one lane marker, the lane marker type of the at least one lane marker, the geographical position of the vehicle, and the speed of the vehicle, and wherein the second predefined probability $T_k$ is based on the yaw rate of the vehicle.

4. The method according to claim 1, wherein the sensor data comprises lane marker data comprising a distance to the at least one lane marker and a type of the at least one lane marker.

5. The method according to claim 1, wherein the vehicle data further comprises a yaw rate of the vehicle.

6. The method according to claim 2, further comprising: forming a spatial database based on the HD map data and a spatial indexing method.

7. The method according to claim 1, further comprising: sending the probable path to a control system for controlling a driver-assistance or autonomous driving feature of the vehicle based on the probable path.

8. A non-transitory computer-readable storage medium storing one or more computer readable codes which, when executed by one or more processors of a vehicle control system, the one or more computer readable codes comprising instructions for performing the method comprising:

receiving vehicle data comprising a geographical position of the vehicle, a heading of the vehicle, and a speed of the vehicle;

receiving sensor data from a perception system of the vehicle, the sensor data comprising information about a position of at least one road reference in a surrounding environment of the vehicle;

receiving high-definition (HD) map data comprising a lane geometry of the surrounding environment of the vehicle, the lane geometry comprising a set of candidate lanes;

forming a state space model comprising a set of states, wherein each state of the set of states represents a candidate lane of the set of candidate lanes;

defining a cost for going from each state to every other state of the set of states based on the received vehicle data, the received sensor data and the received HD map data; and determining a probable path of vehicle travel based on the formed state space model and the defined costs, wherein the determining the probable path comprises decoding the formed state space model in order to estimate the maximum likelihood of a plurality of state sequences and determine the most probable state sequence; and sending the probable path to a map generating system for updating an HD map of the surrounding environment.

9. A control device for lane-level map matching for a vehicle, the control device comprising control circuitry configured to:

receive vehicle data comprising a geographical position of the vehicle, a heading of the vehicle, and a speed of the vehicle;

receive sensor data from a perception system of the vehicle, the sensor data comprising information about a position of at least one road reference in a surrounding environment of the vehicle;

receive high-definition (HD) map data comprising a lane geometry of the surrounding environment of the vehicle, the lane geometry comprising a set of candidate lanes;

form a state space model comprising a set of states, wherein each state of the set of states represents a candidate lane of the set of candidate lanes;

define a cost for going from each state to every other state of the set of states based on the received vehicle data, the received sensor data and the received HD map data; and determine a probable path of vehicle travel based on the formed state space model and the defined costs, wherein the control circuitry determines the probable path by decoding the formed state space model in order to estimate the maximum likelihood of a plurality of state sequences and determine the most probable state sequence; and send the probable path to a map generating system for updating an HD map of the surrounding environment.

10. The control device according to claim 9, wherein each state is a hidden state in a Hidden Markov Model, and wherein the control circuit is configured to define the cost based on:

a first predefined probability $E_k$ for making an observation $y_k$ at a time $t_k$ when being in state $x_k$, the state being represented by a candidate lane of said set of candidate lanes; and a second predefined probability $T_k$ for moving from a first state $x_k$ of the set of states to another state $x_{k+1}$ of the set of states at the time $t_k$.

11. The control device according to claim 10, wherein the sensor data comprises lane marker data comprising a distance to the at least one lane marker and a lane marker type of the at least one lane marker, wherein the vehicle data further comprises a yaw rate of the vehicle, wherein the first predefined probability $E_k$ is based on at least one of the distance to the at least one lane marker, the lane marker type of the at least one lane marker, the geographical position of the vehicle, and the speed of the vehicle, wherein the second predefined probability $T_k$ is based on the yaw rate of the vehicle.

12. The control device according to claim 10, wherein the control circuitry is further configured to:

forming a spatial database based on the HD map data and a spatial indexing method.

13. The control device according to claim 9, wherein the control circuitry is further configured to:

send the probable path to a control system for controlling a driver-assistance or autonomous driving feature of the vehicle based on the probable path.

14. A vehicle comprising:

a perception system comprising at least one sensor for monitoring a surrounding environment of the vehicle;

an inertial measurement unit, IMU, for measuring an inertial movement of the vehicle;

a localization system for monitoring a geographical position and a heading of the vehicle; and a control device for lane-level map matching for a vehicle, the control device comprising control circuitry configured to:

receive vehicle data comprising a geographical position of the vehicle, a heading of the vehicle, and a speed of the vehicle;

receive sensor data from a perception system of the vehicle, the sensor data comprising information about a position of at least one road reference in a surrounding environment of the vehicle;

receive high-definition (HD) map data comprising a lane geometry of the surrounding environment of the vehicle, the lane geometry comprising a set of candidate lanes;

form a state space model comprising a set of states, wherein each state of the set of states represents a candidate lane of the set of candidate lanes;

define a cost for going from each state to every other state of the set of states based on the received vehicle data, the received sensor data and the received HD map data; and determine a probable path of vehicle travel based on the formed state space model and the defined costs, wherein the control circuitry determines the probable path by decoding the formed state space model in order to estimate the maximum likelihood of a plurality of state sequences and determine the most probable state sequence; and send the probable path to a map generating system for updating an HD map of the surrounding environment.

* * * * *